US009626557B2

(12) United States Patent
Stewart

(10) Patent No.: US 9,626,557 B2
(45) Date of Patent: Apr. 18, 2017

(54) DETECTION OF THE PRESENCE OF AN ITEM USING REFLECTION CHARACTERISTICS

(71) Applicant: INNOVIA FILMS LIMITED, Wigton, Cumbria (GB)

(72) Inventor: Robert Stewart, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 42 days.

(21) Appl. No.: 14/433,498

(22) PCT Filed: Oct. 14, 2013

(86) PCT No.: PCT/EP2013/071432
§ 371 (c)(1),
(2) Date: Apr. 3, 2015

(87) PCT Pub. No.: WO2014/060359
PCT Pub. Date: Apr. 24, 2014

(65) Prior Publication Data
US 2015/0262008 A1    Sep. 17, 2015

(30) Foreign Application Priority Data
Oct. 15, 2012    (GB) .................................. 1218460.2

(51) Int. Cl.
*G06K 9/00*    (2006.01)
*G07D 7/12*    (2016.01)
(Continued)

(52) U.S. Cl.
CPC ........... *G06K 9/00469* (2013.01); *G06K 9/46* (2013.01); *G07D 7/12* (2013.01); *H04N 7/18* (2013.01); *G06K 2009/4666* (2013.01)

(58) Field of Classification Search
CPC combination set(s) only.
See application file for complete search history.

(56) References Cited

U.S. PATENT DOCUMENTS

| 4,587,434 A | 5/1986 | Roes et al. |
| 2001/0046314 A1* | 11/2001 | Neri .......................... G07D 7/00 382/135 |

(Continued)

FOREIGN PATENT DOCUMENTS

| AU | 2005204064 | 7/2005 |
| CN | 202372256 | 8/2012 |

(Continued)

OTHER PUBLICATIONS

International Search Report and the Written Opinion of the International Searching Authority of International application No. PCT/EP2013/071432 mailed Jan. 3, 2014.

*Primary Examiner* — Alex Liew
(74) *Attorney, Agent, or Firm* — Ping Wang; Andrews Kurth Kenyon LLP

(57) ABSTRACT

The present invention provides an apparatus for detecting presence or otherwise of an item comprising at least two regions having different optical characteristics, said apparatus comprising: an emitter operative to illuminate a measuring region of said apparatus with electromagnetic radiation; and a detector located and operative to receive electromagnetic radiation reflected from said measuring region of said apparatus and operative to output a signal corresponding to a measured characteristic of said electromagnetic radiation reflected from said measuring region, wherein said apparatus is operative to compare said measured characteristic with a set of pre-defined characteristics, and further wherein if said measured characteristic is consistent with at least one of said pre-defined characteristics, the apparatus is operative to output a signal indicative of presence or otherwise of one of said at least two regions of said item in said measuring region.

Also provided is a method for detecting presence or otherwise of an item comprising at least two portions having (Continued)

different optical characteristics, and a banknote counting apparatus comprising the detection apparatus and operative to implement the method.

43 Claims, 6 Drawing Sheets

(51) Int. Cl.
*G06K 9/46* (2006.01)
*H04N 7/18* (2006.01)

(56) References Cited

U.S. PATENT DOCUMENTS

2003/0015395 A1* 1/2003 Hallowell ............... G07D 7/00
  194/206
2013/0004026 A1* 1/2013 Blair .................... G06K 9/2018
  382/112

FOREIGN PATENT DOCUMENTS

GB  2 373 324  9/2002
GB  2 379 501  3/2003

* cited by examiner

DETECTION OF THE PRESENCE OF AN ITEM USING REFLECTION CHARACTERISTICS

This application is a national stage application of International Patent Application No. PCT/EP2013/071432, filed Oct. 14, 2013, which claims priority to United Kingdom Patent Application No. 1218460.2, filed Oct. 15, 2012. The entirety of the aforementioned applications is incorporated herein by reference.

FIELD

The present invention relates to a detection apparatus and method of detecting presence or otherwise of an item comprising at least two regions having different optical characteristics, and particularly, but not exclusively, for detecting presence or absence of items such as security documents and products which may be at risk of being counterfeited. Further particularly, for detecting presence or absence of a polymer film banknote.

BACKGROUND

Polymer films are increasingly being used as substrates in fields where security, authentication, identification and anti-counterfeiting are important. Polymer-based products in such areas include for example bank notes, important documents (e.g. ID materials such as for example passports and land title, share and educational certificates), films for packaging high-value goods for anti-counterfeiting purposes, and security cards.

Polymer-based secure materials have advantages in terms of security, functionality, durability, cost-effectiveness, cleanliness, processability and environmental considerations. Perhaps the most notable amongst these is the security advantage. Paper-based bank notes, for example, can be relatively easy to copy, and there is lower occurrence of counterfeits in countries with polymer-based bank notes compared to paper-based bank notes. Polymer-based bank notes are also longer-lasting and less-easily torn.

Security materials based on polymer films are amenable to the incorporation of a variety of visible and hidden security features. Since the introduction of the first polymer bank notes approximately 25 years ago, security features have including optically variable devices (OVD), opacification features, printed security features security threads, embossings, transparent windows and diffraction gratings. Aside from complicated security features there is also the more immediate advantage that the high temperatures used in copying machines will often cause melting or distortion of polymer base-material if counterfeiters attempt simply to copy secure materials (e.g. bank notes) using such machines.

DETAILED DESCRIPTION

A variety of polymers may be used as secure substrates. Amongst these is polypropylene film. The three main methods of manufacturing polypropylene film are the stenter method, the cast method and the bubble method.

The basic polymer substrate for such bank notes is processed using some, or all, of the following steps to arrive at the finished product:

1. Opacifying—two layers of ink (usually white) are applied to each side of the note, except for one or more regions that are deliberately left clear, e.g. as a transparent or partially transparent window;

2. Sheeting—the substrate is cut into sheets suitable for the printing press;

3. Printing—one or more of traditional offset, intaglio and letterpress printing processes may be used; and 4. Overcoating—notes are coated with a protective varnish.

Windows in paper substrate banknotes may be made by combining holes in paper layers with polymer film inserts or overlays. The manufacturing processes are complex and produce substrates of comparatively low durability with windows that are limited in their size, number and their position within the note due to the requirement of the paper layers to support the polymer inserts.

Manufacturers have looked to polymer substrate banknotes to provide more durable banknotes and to allow for larger and more windows to be incorporated in a banknote. Examples of banknotes comprising window features are illustrated schematically in FIGS. 1a and 1b.

Figure 1A:
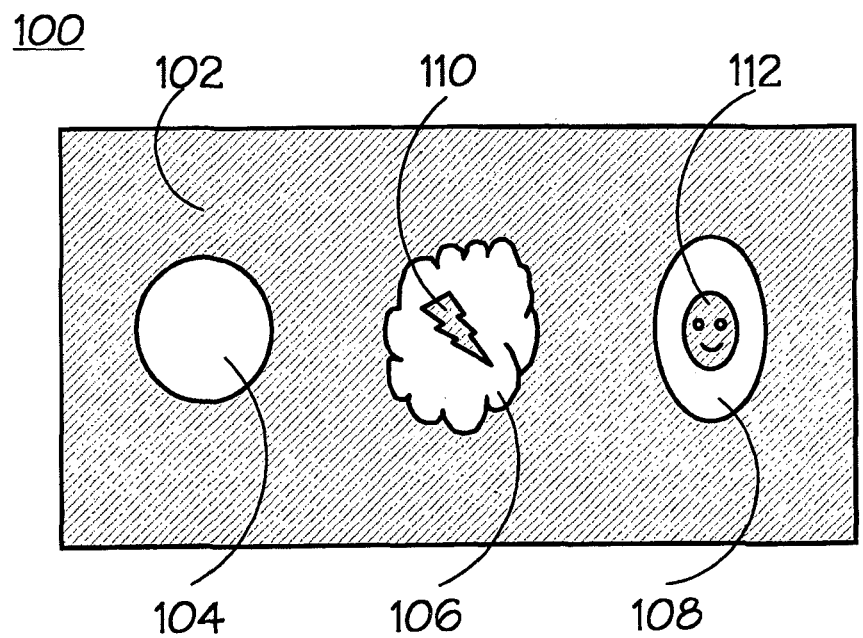
FIGS. 1a and 1b schematically illustrate banknotes comprising window features.

FIG. 1a illustrates a banknote 100 formed from a polymer substrate on which suitable ink is printed to form printed areas 102. However, not all of the banknote surface is printed upon and regions 104, 106, 108 are unprinted to form windows. First window 104 comprises a first unprinted area of the banknote surface. Second window 106 comprises a second unprinted area of the banknote surface plus a so-called "in-window" feature 110, which may comprise a printed region within the window. Third window 108 comprises a third unprinted area of the banknote surface which also includes an in-window feature 112.

Figure 1B:
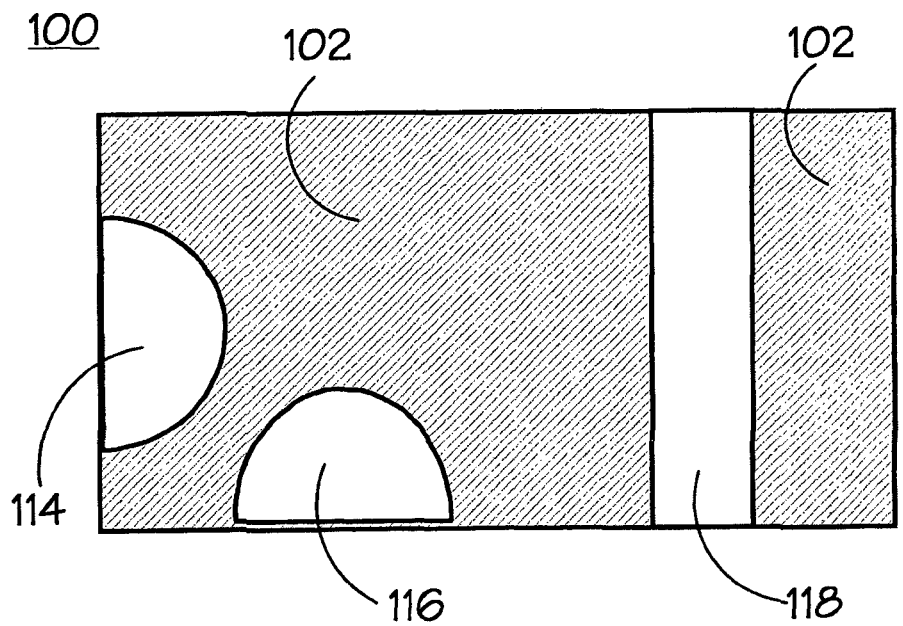

FIG. 1b illustrates schematically a banknote incorporating so-called "edge" type and "edge-to-edge" type windows. Again, the banknote 100 is formed from a polymer substrate on which suitable ink is printed to form printed areas 102. However, not all of the banknote surface is printed upon and regions 114, 116, 118 of the banknote surface are left blank to form window regions of the banknote. These window regions comprise a first edge window 114, a second edge window 116 and an edge-to-edge window 118.

It would be desirable to introduce into circulation banknotes incorporating the features illustrated in FIGS. 1a and 1b (i.e. window concepts featuring multiple, complex, edge and in-window features). However, banknotes incorporating these features may cause problems in banknote detection technology systems.

In banknote detection technology systems such as, for example, note counting or note feeding systems, notes incorporating one or more of the above window types may be miscounted.

Note feeding or counting systems contain transmissive edge detection sensors that are used to detect the beginning and the end of a note. They are used for the purposes of timing feeding through the machine and to measure the length of a note. The presence or absence of a note is detected by measuring relative transmittance in a measuring region. An emitter is located at one side of the measuring region and a detector is located on an opposite side of the measuring region. The emitter is operative to emit a beam of illuminating electromagnetic radiation toward the detector, and the detector is operative to receive said beam of illuminating electromagnetic radiation emitted by the emitter. The emitter and detector are spaced apart about the measuring region and are arranged to allow a bank note to be transported therebetween. As the banknote passes between the emitter and detector, it breaks the beam of illuminating electromagnetic radiation between emitter and detector, thereby affecting the intensity of the electromagnetic radiation received by the detector (i.e. a reduction in transmission of illuminating electromagnetic radiation is detected by the detector).

These types of sensor assume that the banknote to be detected comprises a generally optically opaque substrate (e.g. due to the presence of ink printed thereon). Therefore, a large increase in transmission may be interpreted by control equipment to which the detector is communicatively coupled as being associated with a trailing edge of a note. A large decrease in transmission may be interpreted by the control equipment may be interpreted as a leading edge of a note.

If a window-type note is passed through such a sensor, the window in the polymer substrate note will cause a large increase in transmission (i.e. more illuminating electromagnetic radiation being received by the detector). Thus, in such sensors, areas of no print, such as windows, effectively cannot be seen and therefore may be registered as tears, partial notes or objects that are not banknotes. It will be appreciated that these issues can potentially lead to miscounting of notes being fed through the machines of the note feeding or counting system.

Aspects and embodiments of the present invention were devised with the foregoing in mind.

According to an aspect of the present invention, there is provided a detection apparatus for detecting presence or otherwise of an item comprising at least two regions having different optical characteristics, said apparatus comprising: an emitter operative to illuminate a measuring region of said apparatus with electromagnetic radiation; and a detector located and operative to receive electromagnetic radiation reflected from said measuring region and operative to output a signal corresponding to a measured characteristic of said electromagnetic radiation reflected from said measuring region, wherein said apparatus is operative to compare said measured characteristic with a set of pre-defined characteristics, and further wherein if said measured characteristic is consistent with one of said pre-defined characteristics, the apparatus is operative to output a signal indicative of presence or otherwise of one of said at least two regions of said item in said measuring region.

One or more embodiments of the present invention may allow the occurrence of false readings caused by a note-window leading or trailing edge being mistakenly read as a note leading edge or trailing edge to be reduced or inhibited. The one or more embodiments of the present invention may be operative to measure optical reflection characteristics in a measuring region. By comparing measured optical reflection characteristics with a pre-determined set of characteristics, the apparatus can determine which one of a printed portion of a banknote, and a window portion of a banknote is present in the measuring region, and further if a banknote is absent from the measuring region. That is, the apparatus can be used to differentiate between film (i.e. window) and air, and also film and printed areas. Thus, if employed in a banknote counting apparatus, the apparatus of one or more embodiments of the present invention could instruct the counting apparatus to alter a count only when a leading or trailing edge of a banknote is detected, but not when a leading or trailing edge of a window is detected.

Optionally, the optical characteristic of the banknote measured by the apparatus is optical gloss of the portion of the banknote in the measuring region. That is, the intensity of the reflected electromagnetic radiation received by the detector is a measure of the surface reflectivity (or "gloss") of the portion of the banknote located in the measuring region.

Gloss is a measurable optical characteristic of a film. For example, Clarity®C base film (a Biaxially Oriented Polypropylene (BOPP) film manufactured by Innovia Films Ltd., Wigton, UK), at 45° has an optical gloss of 85. Since gloss units are based on a 0-1000 scale, this means that the reflectivity at this angle is 8.5%. Comparing this figure of a reflective detection system with a transmissive detection system: an 8.5% reflection implies a 91.5% transmission. Therefore, a transmissive detection system will be looking for at most an 8.5% drop in signal to generate a result—something that could be affected by the variability in voltage supply, vibration, or even changes in ambient light. A transmissive detection system may not be able to operate effectively at this level of transmission, because such a system would be too sensitive to operate in a real world application. One or more embodiments of the present invention may provide reflective optical system that will have a very low background signal that may react when a reflection of about 8.5% is achieved from each surface (or a higher reflection percentage if a higher illumination angle is used).

Further information on gloss measurement can be obtained from the standard relating to gloss measurement units, i.e. ASTM D2457-08e1 Standard Test Method for Specular Gloss of Plastic Films and Solid Plastics.

Optionally, the output signal corresponding to a measured characteristic is proportional to an intensity of reflected electromagnetic radiation received.

Optionally, the detector may be operative to communicate the output signal corresponding to a measured characteristic to a processor which is operative to compare a value of the output signal with the set of pre-defined characteristics, which comprise a set of pre-defined values indicative of presence or otherwise of any one of the at least two regions of the item in the measuring region, and the processor may be operative to output the signal indicative of presence or otherwise of one of the at least two regions of the item in the measuring region dependent upon the comparison.

The pre-defined characteristics may, optionally, comprise one or more of: a first range of values corresponding to expected detector output signal values if an opaque or semi-opaque region of the item is located in the measuring region; a second range of values corresponding to expected detector output signal values if a transparent or semi-transparent region of the item is located in the measuring region; and a third range of values corresponding to expected detector output signal values if no item is present in the measuring region.

Optionally, the item may comprise a banknote, and the opaque or semi-opaque region may comprise a printed region of the banknote. Further optionally, the transparent or semi-transparent region of the item may comprise an unprinted or window region of the banknote.

The detector may have associated therewith a shade, the shade including at least one aperture, wherein the aperture is located with respect to the detector to permit electromagnetic radiation reflected from the measuring region to be received by the detector. Optionally, the aperture may comprise a tubular region in the shade and, further optionally, the detector may be located within the tubular region.

Yet further optionally, the emitter may have associated therewith a shade, the shade including an aperture, wherein the aperture is located with respect to the emitter to permit electromagnetic radiation emitted from the emitter to be directed toward the measuring region of said apparatus. Again, the aperture may comprise a tubular region in the shade and, optionally, the emitter may be located within the tubular region.

Optionally, the shade may comprise a plurality of emitter apertures and a plurality of detector apertures, wherein each of the plurality of emitter apertures has associated therewith an emitter and each of the plurality of detector apertures has associated therewith a detector.

The emitter may be operative to emit coherent electromagnetic radiation and may, optionally, comprise at least one LED. Further optionally, the at least one LED may be operative to emit light in the infra-red range of the electromagnetic spectrum. Yet further optionally, the emitter may comprise a white light emitter source. Still further optionally, the emitter may comprise at least one strip electromagnetic radiation source.

The detector may comprise at least one photodiode which may, optionally, be operative to detect light in the infra-red range of the electromagnetic spectrum. Further optionally, the detector may comprise at least one line-scan camera and/or at least one spectrometer, and a CCD or CMOS image sensor.

Optionally, the emitter may comprise at least one of: a plurality of LEDs; a plurality of white light emitter sources; and a plurality of strip electromagnetic radiation sources; and, optionally, the detector may comprise at least one of: a plurality of photodiodes; a plurality of line-scan cameras; and a plurality of spectrometers and CCD or CMOS image sensors; wherein each one of the plurality of LEDs may be paired with a corresponding one of the plurality of photodiodes and/or plurality of line-scan cameras and/or plurality of spectrometers and CCD or CMOS image sensors, wherein each one of the plurality of white light emitter sources may be paired with a corresponding one of the plurality of photodiodes and/or plurality of line-scan cameras and/or plurality of spectrometers and CCD or CMOS image sensors, and wherein each one of the plurality of strip electromagnetic radiation sources may be paired with a corresponding one of the plurality of photodiodes and/or plurality of line-scan cameras and/or plurality of spectrometers and CCD or CMOS image sensors.

Optionally, at least one of the plurality of LEDs may be operative to emit light in the infra-red range of the electromagnetic spectrum. Further optionally, at least one of the plurality of photodiodes may be operative to detect light in the infra-red range of the electromagnetic spectrum.

Optionally, the apparatus may include a transport path, of which a part comprises the measuring region, and along which item transport path the item may be conveyable.

According to another aspect of the present invention, there is provided a banknote counting apparatus comprising the detection apparatus comprising any one or more of the above-described features, the banknote counting apparatus further comprising a note counting device operative to maintain a count of banknotes conveyed through the apparatus, and further operative to receive the signal indicative of presence or otherwise of one of said at least two regions of the item in the measuring region, wherein when the signal changes from a level indicative of presence of one of the at least two portions of the item in the measuring region to a level indicative of absence of an item in the measuring region, or vice versa, the note counting device is operative to alter the count.

Optionally, upon a signal change, the note counting device is operative to alter the note count by incrementing the count.

According to another aspect of the present invention, there is provided a method of detecting presence or otherwise of an item comprising at least two regions having different optical characteristics, said method comprising: illuminating a measuring region of the apparatus with electromagnetic radiation; receiving electromagnetic radiation reflected from the measuring region and outputting a signal corresponding to a measured characteristic of said electromagnetic radiation reflected from said measuring region; comparing a measured characteristic with a set of pre-defined characteristics, wherein if the measured characteristic is consistent with at least one of the pre-defined characteristics, outputting a signal indicative of presence or otherwise of at least one of said at least two portions of one of the at least two regions of the item in the measuring region.

The output signal corresponding to a measured characteristic may be proportional to an intensity of reflected electromagnetic radiation received.

The method optionally further comprises, communicating the output signal corresponding to a measured characteristic to a processor which is operative to compare a value of the output signal with the set of pre-defined characteristics, which comprise a set of pre-defined values indicative of presence or otherwise of any one of the at least two regions of the item in the measuring region, and outputting, from the processor, the signal indicative of presence or otherwise of one of the at least two regions of the item in the measuring region dependent upon the comparison.

Optionally, the pre-defined characteristics may comprise one or more of: a first range of values corresponding to expected detector output signal values if an opaque or semi-opaque region of the item is located in the measuring region; a second range of values corresponding to expected detector output signal values if a transparent or semi-transparent region of the item is located in the measuring region; and a third range of values corresponding to expected detector output signal values if no item is present in said measuring region.

The item may comprise a banknote and, optionally, the opaque or semi-opaque region may comprise a printed region of the banknote. Further optionally, the transparent or semi-transparent region of the item may comprise an unprinted or window region of the banknote.

Optionally, the electromagnetic radiation may comprise coherent electromagnetic radiation. Further optionally, the electromagnetic radiation may comprise light in the infrared range of the electromagnetic spectrum. Yet further optionally, the electromagnetic radiation may comprise white light.

The method optionally may further comprise, conveying the item via a transport path through the detection apparatus, of which a part of the transport path comprises the measuring region.

According to another aspect of the present invention, there is provided a banknote counting method comprising the method comprising any one or more of the above-described features, and further comprising providing a banknote counting apparatus comprising a note counting device for maintaining a count of banknotes conveyed through the apparatus, and receiving, at the banknote counting apparatus, the signal indicative of presence or otherwise of one of the at least two portions of the item in the measuring region; and altering the count of banknotes when the signal changes from a level indicative of presence of one of the at least two regions of the item in the measuring region to a level indicative of absence of an item in the measuring region, or vice versa.

Optionally, the altering step may comprise altering the note count by incrementing the count.

One or more specific embodiments in accordance with aspects of the present invention will be described, by way of example only, and with reference to the following drawings.

Figure 2:
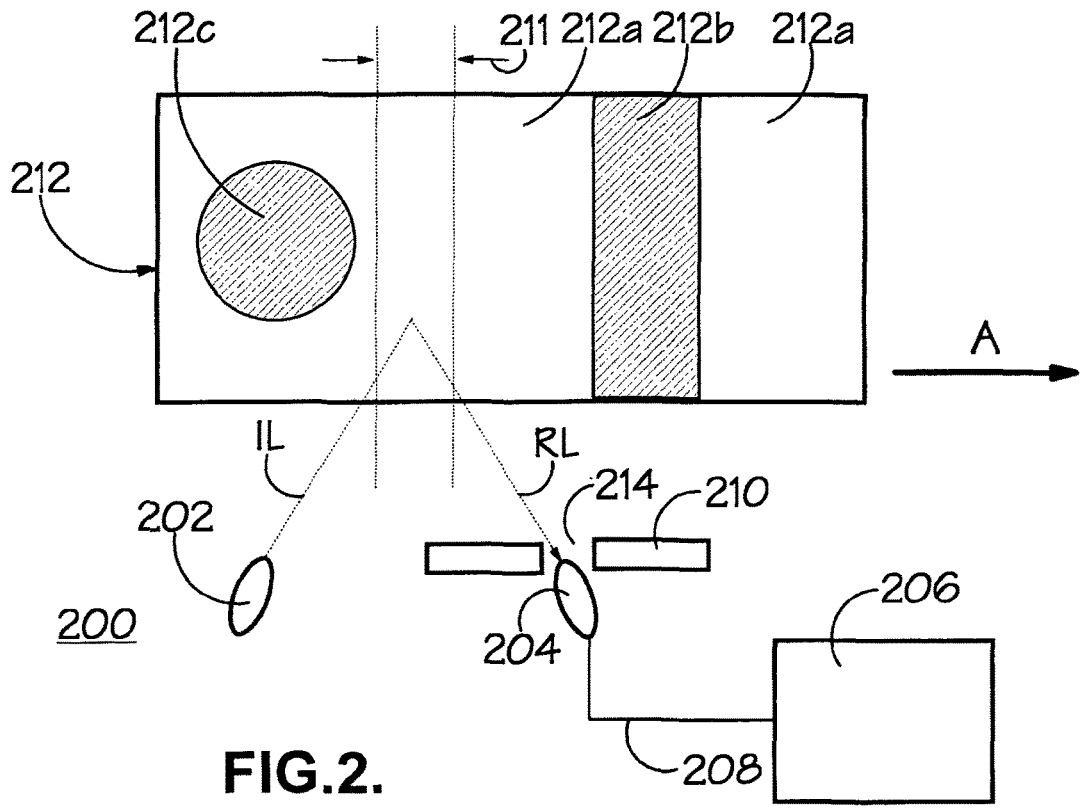
FIG. 2 schematically illustrates a reflective detection apparatus in accordance with one or more embodiments of the present invention.
Figure 4:
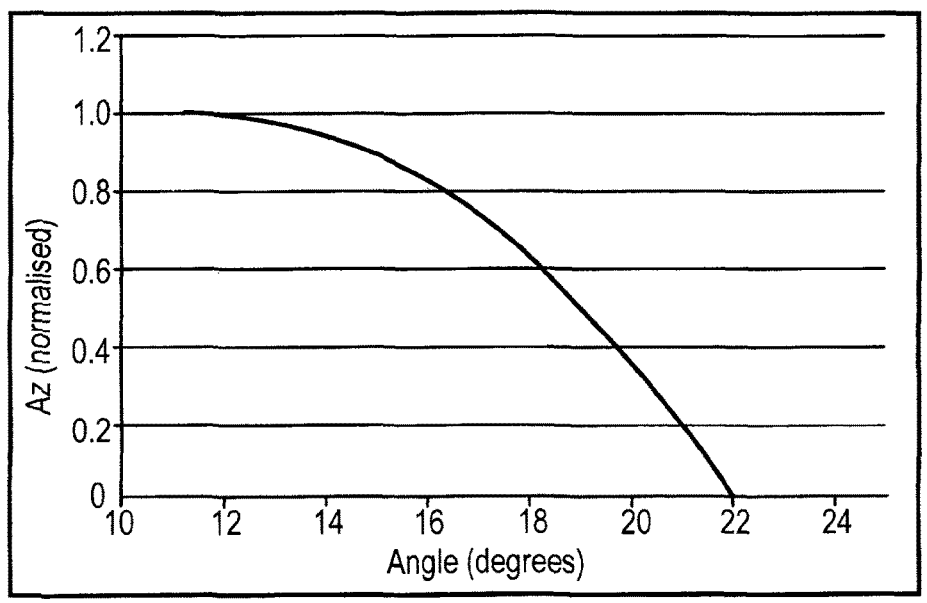
FIG. 4 illustrates a graph plotting intensity of radiation received at a detector dependent upon an angle of incident radiation and an area of the detector.
Figure 3A:
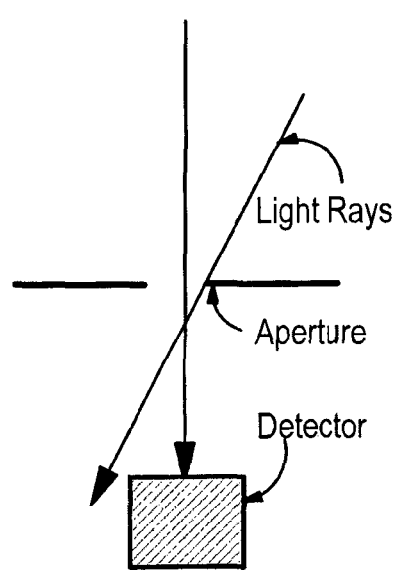
FIGS. 3a, 3b and 3c schematically illustrate detector arrangements of the reflective detection apparatus according to one or more embodiments of the present invention.
Figure 3B:
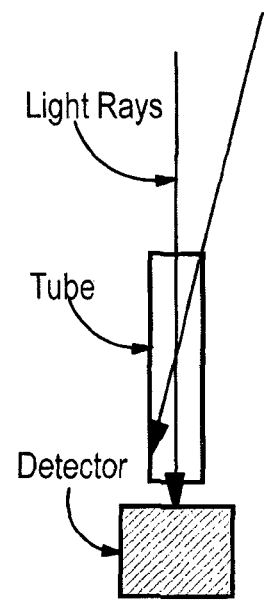
Figure 3C:
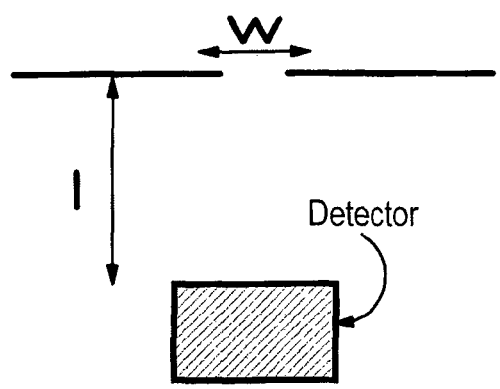
Figure 5:
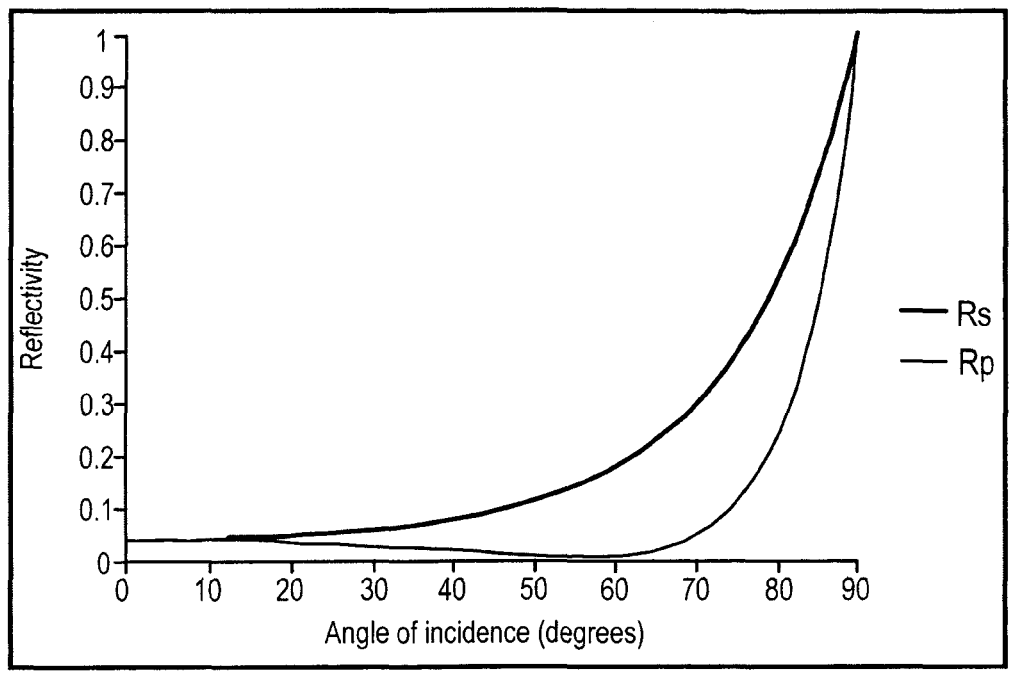
FIG. 5 illustrates a graph plotting angle of incidence of illuminating radiation versus reflectivity of the illuminating radiation from an item surface.
Figure 6:
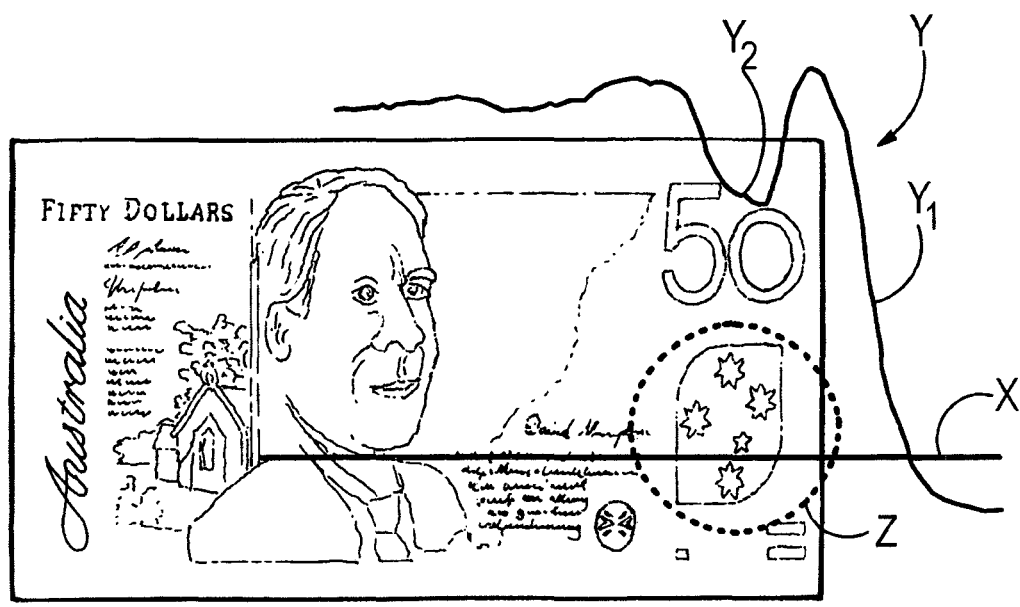
FIG. 6 illustrates a profile of intensity of reflected radiation received by a detector when a banknote is passed through a reflective detection apparatus according to one or more embodiments of the present invention.
Figure 7:
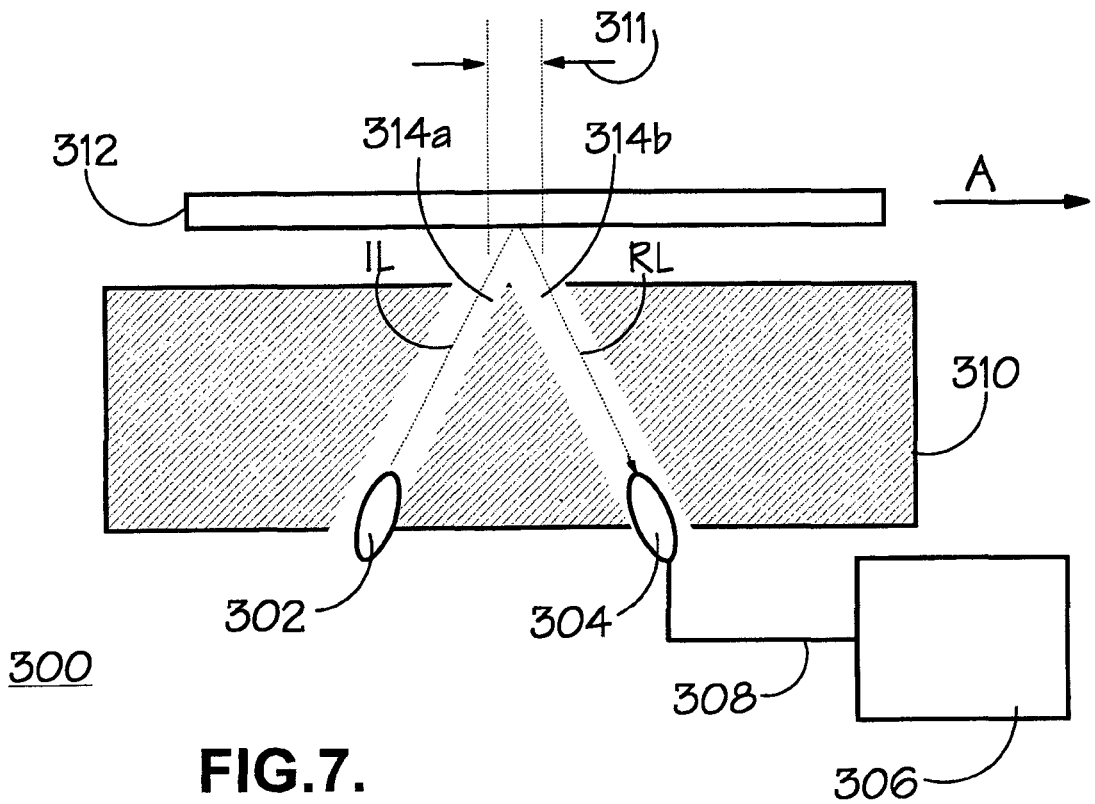
FIG. 7 schematically illustrates a top view of an emitter-detector-item arrangement of the reflective detection apparatus of FIG. 2 in an optional arrangement.
Figure 9:
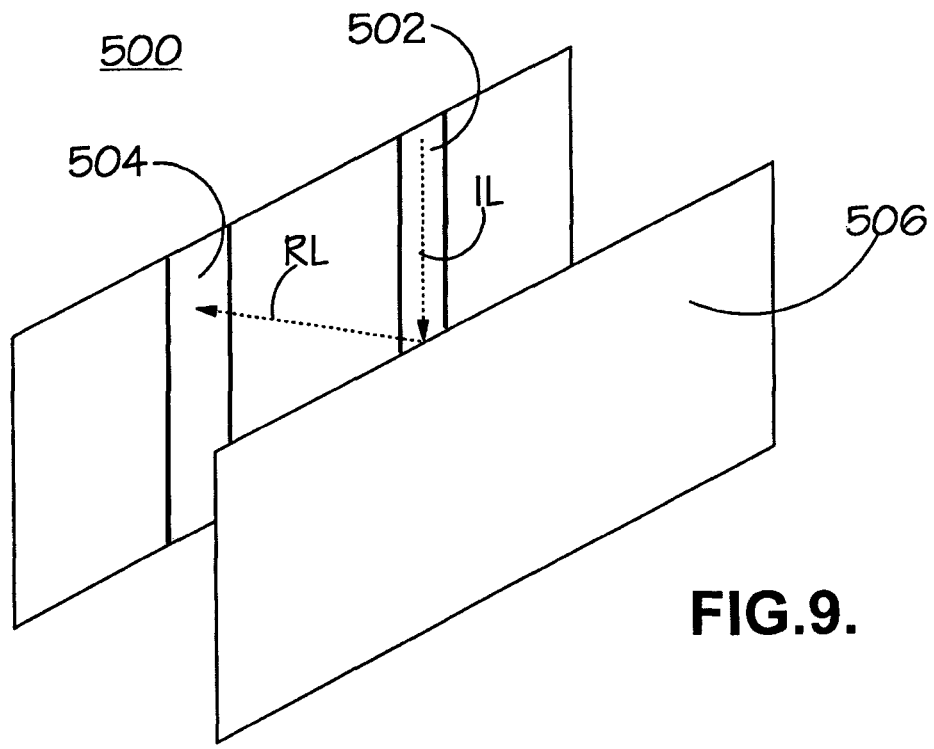
FIG. 9 schematically illustrates a perspective view of an emitter-detector-item arrangement of the reflective detection apparatus of FIG. 2 in a further optional arrangement.
Figure 8:
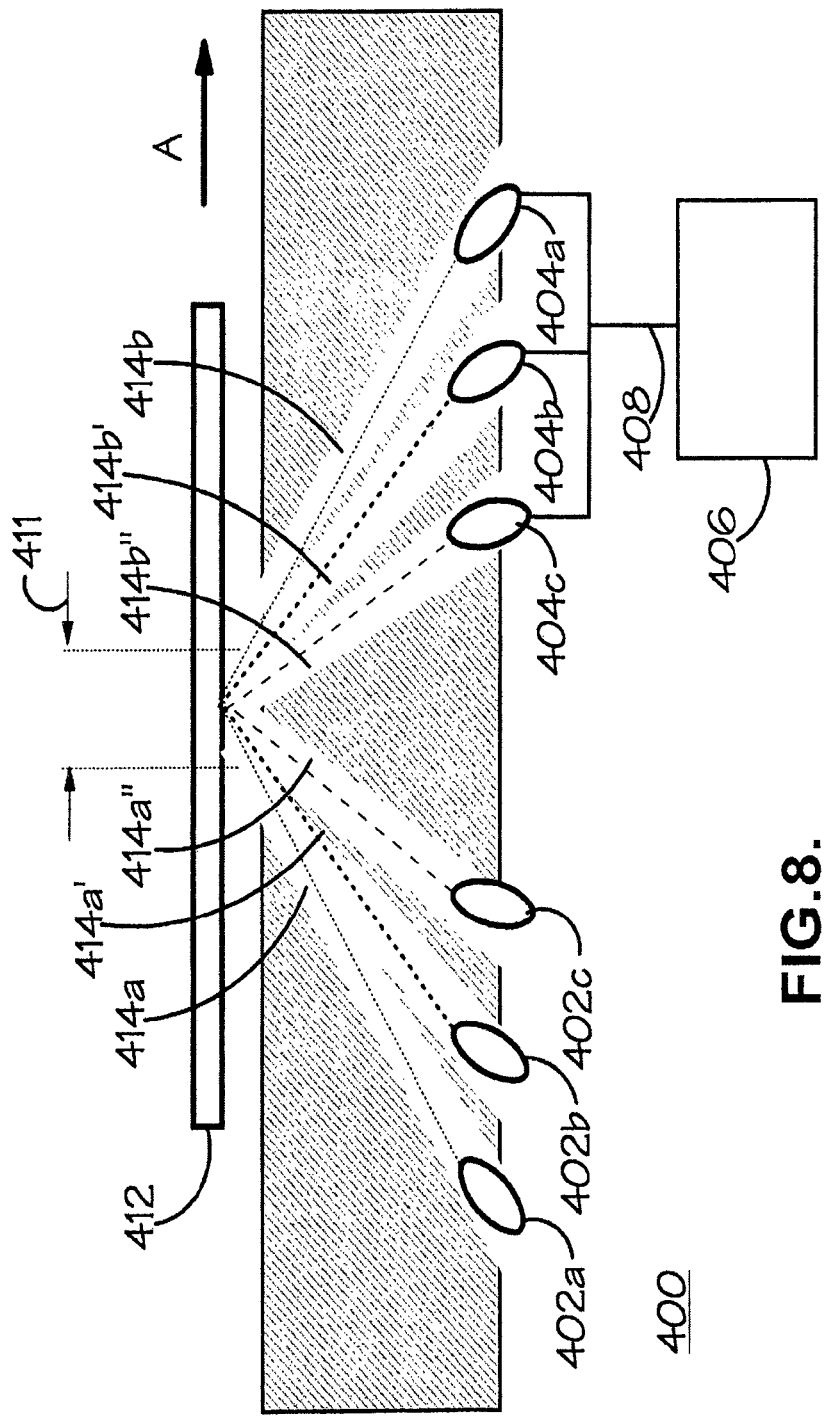
FIG. 8 schematically illustrates a top view of an emitter-detector-item arrangement of the reflective detection apparatus of FIG. 2 in another optional arrangement.

FIGS. 1a and 1b schematically illustrate banknotes comprising window features;

FIG. 2 schematically illustrates a reflective detection apparatus in accordance with one or more embodiments of the present invention;

FIGS. 3a, 3b and 3c schematically illustrate detector arrangements of the reflective detection apparatus according to one or more embodiments of the present invention;

FIG. 4 illustrates a graph plotting intensity of radiation received at a detector dependent upon an angle of incident radiation and an area of the detector;

FIG. 5 illustrates a graph plotting angle of incidence of illuminating radiation versus reflectivity of the illuminating radiation from an item surface;

FIG. 6 illustrates a profile of intensity of reflected radiation received by a detector when a banknote is passed through a reflective detection apparatus according to one or more embodiments of the present invention;

FIG. 7 schematically illustrates a top view of an emitter-detector-item arrangement of the reflective detection apparatus of FIG. 2 in an optional arrangement;

FIG. 8 schematically illustrates a top view of an emitter-detector-item arrangement of the reflective detection apparatus of FIG. 2 in another optional arrangement; and FIG. 9 schematically illustrates a perspective view of an emitter-detector-item arrangement of the reflective detection apparatus of FIG. 2 in a further optional arrangement.

FIG. 2 illustrates a reflective detection apparatus 200 comprising an emitter 202, detector 204, processing means 206 electronically coupled to detector 204 by signal line 208, and a shade 210 associated with the detector 204. The shade 210 serves to protect the detector 204 from stray light so as to prevent false readings caused by stray light being incident upon the detector 204 from sources other than the emitter 202 (e.g. ambient light), and also stray light arising due to scattered and/or high angle light from the emitter 202.

The reflective detection apparatus 200 is configured such that the emitter 202 and detector 204 are oriented to face a measuring region 211. Emitter 202 is operative to illuminate the measuring region 211 with electromagnetic radiation (denoted by dotted arrow IL in the figure), and detector 204 is oriented and operative to receive electromagnetic radiation (denoted by dotted arrow RL in the figure) reflected from a portion of an item located in the measuring region 211.

In an optional arrangement, the reflective detection apparatus 200 may comprise a path along which an item may be conveyed. The measuring region 211 forms part of this path. Thus, in this particular arrangement, the item may be conveyed along the path from one side of the reflection detection apparatus 200 to the other and, during its transit, pass through the measuring region 211.

In the illustrated arrangement, the item comprises a banknote 212 which comprises a polymer substrate which has a banknote design printed on a portion of the substrate surface. A printed portion 212a of the banknote 212 is separated into two regions by a transparent edge-to-edge window region 212b. The banknote 212 further comprises a circular transparent window 212c in one of the two portions of printed portion 212a.

In operation, the banknote 212 will be conveyed along the path in a direction from the left-hand side to the right-hand side of the figure (i.e. as indicated by arrow A). Initially, no portion of the banknote will be in the measuring region 211 of the reflection detection apparatus 200 (this instance is not illustrated).

As the banknote 212 continues its passage through the reflection detection apparatus 200, a portion of the note will be located in the measuring region 211. Such an instance is illustrated in FIG. 2, which shows the left-hand portion of printed region 212a located in the measuring region 211. At that time, illuminating electromagnetic radiation IL from emitter 202 is incident upon the portion of the banknote 212 located in the measuring region 211. Since the portion of the banknote 212 comprises part of the printed region 212a, the reflectivity of that region is relatively high (compared to, for example, a window region or the absence of a note entirely) and relatively little of the incident illuminating electromagnetic radiation IL will pass through the banknote 212. Thus, a relatively large proportion of the incident illuminating electromagnetic radiation IL will be reflected by the printed region 212a. This reflected electromagnetic radiation RL is reflected toward detector 204. As it nears the detector 204, it will pass through an aperture 214 of shade 210 and is then detected by detector 204. The detector 204, responsive to detection of reflected electromagnetic radiation RL incident thereon, outputs a signal proportional to the intensity of received reflected electromagnetic radiation RL via signal line 208 to processing means 206.

Processing means 206, upon receiving an output signal from the detector 204, is operative to compare a value of the received signal with a set of pre-defined values stored in a database (not shown). These pre-defined values may correspond to expected reflected electromagnetic radiation values when one or more of: a printed region of a banknote is located in the measuring region 211; an unprinted region of a banknote (e.g. a window region) is located in the measuring region 211; no banknote is located in the measuring region 211.

As the banknote 212 continues its passage through the reflection detection apparatus 200, the processing means 206 receives a number of readings from the detector 204.

This apparatus 200 may be implemented in, for example, a banknote counting system. The processing means 206 may be operative to output a signal to a counting device only when the signal relating to the reflected electromagnetic radiation RL received at detector 204 changes from: a signal indicating that a printed region 212a or window region (212b, 212c) is present in the measuring region 211 to a signal indicating that no banknote is present in the measuring region 211; or vice versa. However, no signal is output when the signal relating to the reflected electromagnetic radiation RL received at detector 204 changes from: a signal indicating that a printed region 212a is present in the measuring region 211 to a signal indicating that a window region (212b, 212c) is present in the measuring region 211; or vice versa. That is, a count made by the counting device may be altered only when a trailing edge or a leading edge of a banknote 212 passes through the measuring region 211, but not when a leading edge or trailing edge of a window passes through the measuring region 211.

In the illustrated arrangement, the emitter 202 comprises a light emitting diode (LED) which is operative to emit electromagnetic radiation at wavelengths corresponding to the infra-red (IR) region of the electromagnetic spectrum. Optionally, the LED is operative to emit electromagnetic radiation with wavelengths about 890 nm.

The detector 204 in the illustrated arrangement comprises a photodiode operative to detect electromagnetic radiation at wavelengths corresponding to the IR region of the electromagnetic spectrum and, optionally, to detect electromagnetic radiation with wavelengths between about 880 nm and 1140 nm.

Of course, in further optional arrangements, the emitter 202 and detector 204 may be operative, respectively, to emit and detect electromagnetic radiation at other wavelengths in the electromagnetic spectrum.

In the arrangement where the LED is operative to emit electromagnetic radiation having wavelengths of about 890 nm, the photodiode is operative to generate a voltage of approximately 350 mV max upon the detection of light between 880 nm and 1140 nm.

The sensitivity of reflective detection apparatus 200 is dependent upon the angle of the emitter 202 and detector 204 to one another, the distance and angle of the measuring region 211 relative to the emitter 202 and detector 204, the levels of ambient light and the size of the shade 210.

Table 1 lists the initial results; as can be seen, there is a substantial difference between air and a sample placed in the measuring region. There also appears to be some ability to differentiate between film and different materials (as would be expected, film reflects less than printed or opaque materials).

Table 1 (see below) illustrates readings from the detector 204 based upon the amount of incident reflected electromagnetic radiation received at the detector 204 where a number of different samples are illuminated. The readings may be thought of as "gloss readings" because the intensity of the reflected electromagnetic radiation received at the detector 204 effectively comprises a measure of the gloss of the sample being illuminated.

TABLE 1

Detector output values for different illuminated materials

| SAMPLE TYPE | Detector output value (mV) |
|---|---|
| Dark (emitter off) | 8.3 |
| Emitter on | 40 |
| Unprinted polymer film in measuring region | 350 |
| Paper substrate in measuring region | 390 |
| Printed polymer film (1) in measuring region | 390 |
| Printed polymer film (2) in measuring region | 360 |
| Printed polymer film (3) in measuring region | 380 |

In the initial test, the printed polymer film (1) comprises a Thai Baht banknote, the printed polymer film (2) comprises an Australian 20 AUS$ banknote and the printed polymer film (3) comprises an Australian 50 AUS$ banknote.

The test, performed using the illustrated arrangement of FIG. 2, highlights the differences in reflectivity of unprinted film and printed film areas, and also air (i.e. no item present in the measuring region 211).

Adjusting the angles of the emitter 202 and detector 204 with respect one another, and also to the measuring region 211 can give different results. In a second test performed using the illustrated arrangement of FIG. 2, values of 40 mV were obtained for the "emitter on" sample type (i.e. no item present in the measuring region), 75-85 mV for unprinted film and 320 mV+/−20 mV for printed materials.

The parameters which may be relevant to a reflection detection apparatus employing the technique described above will now be discussed. Since the reflection detection apparatus is operative to measure the reflected signal from a polymer surface, it is desirable that the reflections are specular and from as narrow an angular range as possible to ensure that only reflections from film that is in the measurement region are accepted.

In the following description, any reference to "light" is intended to include electromagnetic radiation in both the "visible" part of the electromagnetic spectrum and also the "invisible" part of the electromagnetic spectrum.

Shade Aperture

In those optional arrangements in which the detector is protected by a shade, the dimensions of a shade aperture should be considered. In some optional arrangements, the shade aperture may simply comprise a hole or slit in the shade. In other optional arrangements, the shade aperture may comprise a tube which, optionally, is composed of, or lined with, a non-reflective material.

The aperture width determines the amount of electromagnetic radiation rays collected at any angle, but is indiscriminate as to the origin of these rays and so does not help eliminate noise from ambient electromagnetic radiation sources or scatter.

The "set-back distance" (i.e. the distance between the detector and the item-side of the shade aperture—the "aperture mouth") is related to the accuracy of the apparatus. A large distance between the aperture mouth and the detector will mean that only very precisely angled light will travel the length of the aperture tube to the detector.

The set-back distance may be limited by the physical constraints of the device inside which a detector such as this would be fitted.

The accuracy of the apparatus may also be dependent upon the aperture width. That is, accuracy of the apparatus may depend on the ratio of the aperture width to the set-back distance. Therefore, in larger devices in which a larger set-back distance can be employed, a larger aperture width may be used. However, for more constrained, smaller devices, in which the set-back distance may be small, a narrower aperture should be used. Consequently, this will mean a reduction in the rays collected and therefore sensitivity of the device.

The aperture of the shade is designed to exclude high angle light. It does this via the use of a narrow opening with the detector offset, or "set-back" from the opening. There are two optional arrangements which may be suitable: a black tube, which will absorb stray radiation in its walls (described later in this description); and an open space behind the aperture where high angle light will be propagated out of the range of the detector (i.e. an arrangement such as that illustrated in FIG. 2).

These optional arrangements are illustrated schematically in FIGS. 3a and 3b. The optional arrangements can be simplified (for the process of performing calculations) to the arrangement illustrated in FIG. 3c.

Referring to FIG. 3c, w is the aperture or tube width and l is the offset or "set-back" distance of the detector from the aperture. The tube based design may be a more efficient one when the detector is wider than the aperture/tube diameter. For an aperture design, if the detector is wider than the aperture, then the range of light angles that are accepted by the detector will be greater and for the following calculations, w would become the detector width.

The exception to this is the accuracy of the device, which is proportional to the entrance width for the optical system.

The angle at which light entering the system is at its maximum intensity, $\theta_{max}$ is:

$$\theta_{max} = \tan^{-1}\left(\frac{w}{l}\right) \quad (1)$$

At angles higher than this, light rays that enter the optical system can reach only a fraction of the area of the detector and so can be regarded as losing their intensity proportional to the angular area of the detector they are incident upon.

This area, $A_z$, can be calculated by first setting an exclusion diameter, z, at the centre of the aperture's cross-sectional area. From z, the area of a central zone that cannot be accessed by higher angle light can be calculated and then subsequently subtracted from the overall slit angle to produce a result (which is effectively a ring with an inner diameter of z and an outer one of w).

The following equations show this:

$$\theta_z = \tan^{-1}\left(\frac{w+z}{l}\right) \quad (2)$$

$$A_z = \frac{\pi}{4}[w^2 - z^2] \quad (3)$$

where $\theta_z$ is the angle in question. If $\theta_z$ is plotted against $A_z$ for an aperture of diameter=2 mm and a length of 10 mm and normalise the result, the graph illustrated in FIG. 4 is obtained.

As can be seen, for a system such as this, incident light at less than about 11.5° will be accepted at its full intensity, which will decrease at higher angles, dropping to zero at about 22°.

From this, it is possible to determine the maximum angle of light that can be accepted by the system and when the efficiency of the system begins to decrease.

Incident Angle

In general, reflection of incident rays decreases slightly with increased incident angle until the Brewster angle is reached (~44-54°), after which point reflection increases sharply. However, this is a gross simplification for semi-transparent materials such as BOPP films or pigment filled inks used in film coatings. In reality, such materials have many optical surfaces below the top physical one.

The presence of embedded materials such as pigments which often have substantially different absorbent and reflective properties will cause a material to have substantially different reflective properties across a series of angles.

The angle of incidence to be used for the gloss measurement can be determined by considering the theoretical reflectivity of a surface for the s and p polarisation states:

$$R_s = \left[\frac{\sin(\theta_t - \theta_i)}{\sin(\theta_t + \theta_i)}\right]^2 = \left[\frac{n_1\cos(\theta_i) - n_2\cos(\theta_t)}{n_1\cos(\theta_i) + n_2\cos(\theta_t)}\right]^2 \quad (4)$$

$$R_p = \left[\frac{\sin(\theta_t - \theta_i)}{\sin(\theta_t + \theta_i)}\right]^2 = \left[\frac{n_1\cos(\theta_t) - n_2\cos(\theta_i)}{n_1\cos(\theta_t) + n_2\cos(\theta_i)}\right]^2 \quad (5)$$

Where $\theta_i$=incident angle, $\theta_t$=transmitted angle, $n_1$ and $n_2$=refractive index of media 1 and media 2 respectively.

For a randomly polarised material, the s and p reflections are averaged together to obtain a theoretical reflectivity for a typical light source. The graph illustrated in FIG. 5 illustrates a theoretical reflectivity of a hypothetical polypropylene surface with a refractive index of 1.49.

As can be seen from FIG. 5, the s polarisation state dominates the lower angles, with the p state reflecting very poorly until the Brewster angle ($\tan^{-1}(n_1/n_2)=56.3°$) is exceeded. The use of a non-polarised light source avoids the potential failure of the process at the Brewster angle, where the signal will be zero.

In experiments to determine the viability of the reflection detection apparatus, the angles used were about 45° to about 60°. Using such angles, the reflectivity was between about 5% and about 9%.

As noted above, the reflectivity of the printed areas will be more complex due to the presence of pigmented material under the surface. Firstly, if the surface of the printed area is as flat as the non-printed area, then the overall reflectance could be calculated using equations (4) and (5) but with an additional value that takes into account the reflectivity of pigments under the surface of the ink. As pigments are generally small and well dispersed, this is taken to be a reasonable assumption.

Pigments are designed to absorb parts of the electromagnetic spectrum and reflect others. An ideal pigment will reflect as much light as it can whilst still maintaining its target colour—otherwise it will be quite dull. Conveniently, for the process performed by the apparatus of one or more embodiments of the present invention, both pigments in general and especially banknote pigments are dull. Coupled with this, pigments reflect light in all directions (otherwise it would not be possible to see them unless they are viewed at an angle equal to the incident angle of the ambient light in the environment). This means that, at any one angle, only a portion of the reflected light is seen. Add these two factors together and it means that a great deal of difference between the reflectivities of the printed and unprinted areas would not be expected, except at low angles (<30°) where pigment reflection will make the printed areas reflect more and at angles greater than the Brewster angle, when top surface (and bottom surface in the case of unprinted film) reflections are expected to dominate over pigment reflections making the unprinted areas more reflective.

In an experiment to measure gloss using an apparatus according to one or more embodiments of the present invention, an Australian $50 banknote was passed through the measuring region of the apparatus to mimic a banknote sorting system.

FIG. 6 illustrates the intensity profile detected when the Australian $50 banknote is passed through an apparatus according to one or more embodiments of the present invention.

In the figure, the straight line X illustrates where the apparatus scanned the banknote, and the other line Y illustrates the voltage signal output by the detector.

The pigmented regions of the note reflect more (although not much more) than the window region Z, and are not affected much by the colour of the note (although the colours on this particular note are relatively plain). This experiment was conducted at an angle 60°, where a 9% reflectivity from the film would be expected. If the angle is reduced, then the importance of the pigment in the reflection will increase and vice versa.

It is clear from the graph that the edge of the note can be detected (i.e. the steep increase of the curve (denoted by $Y_1$) at the right-hand side of the figure). Also, the window region Z of the note can be detected—note the decrease in the voltage profile (denoted by $Y_2$) which is coincident with the location of the window region Z.

Detector "Stand-Off" Distance/Divergence/Detector Signal

Light from most sources is highly divergent (the exceptions being laser light and starlight) and therefore any ideal incident ray/reflected ray models quickly break up with increased distance of the detector from the point of reflection. The centre of any divergent light source will still contain the ideal rays, but the greater the distance of the detector from the point of reflection, the less intense the received reflected rays will be.

Therefore, it will be appreciated that increased divergence of illuminating rays and/or increased distance of the detector from the point of reflection will decrease the signal strength of the reading from the detector because the intensity of the received reflected rays will be less.

However, if a detector is close to a surface (and thus, the point of reflection) then it will gather light from a broader range of angles. This may lead to the detector receiving unwanted rays and thus affect the value of the signal output by the detector.

Reflection detection apparatuses according to one or more embodiments of the present invention and arranged to employ the technique described above may require the detector to collect reflected rays from precise angles.

It will be appreciated from the above, therefore, that increasing the distance between the detector and an item surface will increase its accuracy (because the likelihood of the detector gathering light from a broader range of angles is reduced). However, increasing the distance between the detector and an item surface will also reduce the intensity of reflected rays received by the detector.

Additionally, decreasing divergence of the illuminating source (i.e. the emitter) will also increase accuracy of the apparatus as the decreased divergence may result in fewer stray reflections. Therefore, in an optional arrangement, the emitter comprises a laser light source.

Photodiodes generate a voltage that is proportional to the intensity of light that falls upon them. The intensity of light (which must not be confused with radiant intensity) can be calculated from the irradiance of a light source which is given by:

$$I_o = \frac{P\pi d^2}{4} \quad (6)$$

where $I_o$ is the irradiance (W/mm²) at the light source, P is the power of the light source (W) and d is the diameter of the light source (mm).

However, it is the irradiance at the detector rather than the source that is of interest. To establish this, the path length between the light source and the detector (collectively the "probes") must be calculated. The relationship between path length, $l_{path}$, and stand-off distance, $z_{probe}$, is as follows:

$$l_{path} = \frac{2z_{probe}}{\cos\theta_{probe}} \quad (7)$$

where $\theta_{probe}$ is the angle at which the light source and the detectors are set relative to the surface (the angle between the two will be double this). This distance is the distance between light source and detector.

The diameter of the beam at the detector (e.g. photodiode), $d_{photo}$, can be calculated by the following:

$$d_{photo} = d + 2l_{path}\tan\theta_{div} \quad (8)$$

where d is the diameter of the light source and $\theta_{div}$ is the divergence of the light source (which will be quoted as part of the technical specification of the light source).

The intensity at the detector can then be calculated as:

$$I_{div} = \frac{P\pi d_{photo}^2}{4} = \frac{P\pi(d + 2l_{path}\tan\theta_{div})}{4} \quad (9)$$

The intensity drop between source and detector can therefore be calculated by:

$$\text{Intensity Drop} = \frac{I_{div}}{I_o} = \frac{d_{photo}^2}{d^2} \quad (10)$$

Any calculation of stand-off distance must therefore take into account the drop off in intensity from the light source to the detector which is a product of the angles involved and the path lengths of the light. The limits of this will be determined by the light source intensity, the detector sensitivity and the ambient light noise levels.

The light emitted by the light source has three separate conditions with respect to the detector:

If $d_{photo}$>w, then the detector is too far from the measuring region and useful low angle light is being lost.

If $d_{photo}$=w, then the detector is at the correct distance from the measuring region.

If $d_{photo}$<w, then the detector is too close to the measuring region and higher angle light than the detector is designed to accept can find its way into the detector.

Equations (7) and (8) can be rearranged to give equations (11) and (12) which show how the optimal stand-off distance, $z_{probe}$, can be calculated for a divergence angle and a device angle (11); and how the optimal device angle can be calculated for a stand-off distance and divergence angle (12):

$$z_{probe} = \frac{(w-d)\cos\theta_{probe}}{4\tan\theta_{div}} \quad (11)$$

$$\theta_{probe} = \cos^{-1}\left(\frac{4z_{probe}\tan\theta_{div}}{(w-d)}\right) \quad (12)$$

From (11), it may be appreciated that, the lower the light source divergence, the further the possible stand-off distance.

Resolution of the Edge Detection

Another consideration with the apparatus according to one or more embodiments of the present invention is the accuracy of the edge detection, which is a function of the size of w, i.e. the size of entrance aperture/tube diameter. In practice, the resolution of detection will be slightly smaller than the aperture size as the reflected light will diverge as it travels from the film to the aperture.

First, the path length must be calculated. This uses a similar equation to that shown in equation (7). However, this path length is from the surface of the film only and from the aperture to the film instead of from the film to the detector:

$$l_{reflected} = \frac{z_{aperature}}{\cos\theta_{probe}} \quad (13)$$

where $l_{reflected}$ is the reflected path length and $z_{aperture}$ is the distance between the film surface and the aperture.

From this, it is possible to calculate the width of the ray, $d_{res}$, that would be accepted by an aperture of $d_{aperture}$ width and over a path length of $l_{ref}$. The method is the reverse of equation (8), substituting in the new widths and path lengths that describe the reflected light:

$$d_{res} = d_{aperture} - 2l_{ref}\tan\theta_{div} \quad (14)$$

The resolution would therefore be greater than the aperture—which could be considered as the minimum resolution of the system.

Wavelength

Wavelength of the illuminating rays may alter the behaviour of reflections with respect to surface roughening (i.e. altered interference).

In an optional arrangement described above, an IR emitter is used. This may improve accuracy of the apparatus because the detector in such an arrangement is IR ray sensitive and so may be unaffected by interference from ambient light sources. However, in other optional arrangements, emitters operative to emit electromagnetic radiation from other parts of the electromagnetic spectrum may be suitable. In such cases, the detector may be protected from stray rays by, for example, a shade.

Item or Bank Note Angle

Although in the ideal situation, the angle of the item or banknote to the detector will always be the same, in reality this will not always be the case. For example, the banknote may contain creases, or draughts may cause "flutter" of the note in the measuring region. Variations in note to detector angle will alter the angle of the desired reflection. To counter this, the angular range of detector acceptance can be increased (through shortening the set-back distance). However, this may decrease the accuracy of the device, so a suitable balance between these conflicting parameters will need to be achieved.

The variance in the reflectivity angle caused by the above-described example phenomena may be plus or minus a few degrees. Such a variance could be accounted for in an optional arrangement by employing an interpretation module in the apparatus to effectively remove detector readings caused due to variance in reflectivity angle.

FIG. 7 schematically illustrates a top view of an emitter-detector-item arrangement of the above-described reflective detection apparatus of FIG. 2 in an optional arrangement. Features similar to those illustrated in FIG. 2 are also illustrated in FIG. 7. In FIG. 7, the features common with those FIG. 2 are now designated with reference numerals of the type 3XX rather than 2XX. Thus, in FIG. 7, the reflective detection apparatus is denoted by reference number 300 (rather than 200), the emitter, by reference number 302 (rather than 202) and so on.

The reflective detection apparatus 300 comprises an emitter 302, detector 304, processing means 306 electronically coupled to detector 304 by signal line 308, and a shade 310 associated with the emitter 302 and detector 304. The shade 310 will be described in more detail later.

The reflective detection apparatus 300 is configured such that the emitter 302 and detector 304 are oriented to face a measuring region 311. Emitter 302 is operative to illuminate the measuring region 311 with electromagnetic radiation (denoted by dotted arrow IL in the figure), and detector 304 is oriented and operative to receive electromagnetic radiation (denoted by dotted arrow RL in the figure) reflected from a portion of an item located in the measuring region 311.

Optionally, the reflective detection apparatus 300 may comprise a path along which an item may be conveyed. The measuring region 311 forms part of this path. Thus, in this particular arrangement, the item may be conveyed along the path from one side of the reflection detection apparatus 300 to the other and, during its transit, pass through the measuring region 311.

In the illustrated arrangement, the item comprises a banknote 312.

The shade 310 in the illustrated arrangement comprises a main body element in which are provided an emitter tube 314a and a detector tube 314b. The emitter 302 is located at, or near, one end of emitter tube 314a on a first side of the shade 310. The detector 304 is located at, or near, one end of detector tube 314b on the first side of the shade 310. Illuminating electromagnetic radiation IL emitted by emitter 302 travels through emitter tube 314a and emerges from the emitter tube 314a at a mouth portion thereof. The mouth portion is located on a second side of the shade 310. Detector tube 314b is located and oriented within the shade 310 relative to the emitter tube 314a and measuring region 311 such that reflected electromagnetic radiation RL reflected from the measuring region 311 enters detector tube 314b at a mouth portion thereof. The mouth portion of the detector tube 314b is located on a second side of the shade 310. After entering the detector tube 314b via mouth portion, the reflected electromagnetic radiation RL travels along detector tube 314b to detector 304.

In operation, the banknote 312 will be conveyed along the path in a direction from the left-hand side to the right-hand side of the figure (i.e. as indicated by arrow A). The instance illustrated in FIG. 7 shows the banknote 312 with a portion thereof located in the measuring region 311. Illuminating electromagnetic radiation IL from emitter 302 passes through emitter tube 314a and exits the emitter tube 314a from the mouth portion thereon. After exiting the emitter tube 314a, the Illuminating electromagnetic radiation IL is incident upon the portion of the banknote 312 located in the measuring region 311. At least a portion of the incident illuminating electromagnetic radiation IL will be reflected by the banknote 312. This reflected electromagnetic radiation RL is reflected toward mouth portion of detector tube 314b, from where it enters detector tube 314b and continues thereafter to detector 304. The detector 304, responsive to detection of reflected electromagnetic radiation RL incident thereon, outputs a signal proportional to the intensity of received reflected electromagnetic radiation RL via signal line 308 to processing means 306.

Processing means 306, upon receiving an output signal from the detector 304, is operative to compare a value of the received signal with a set of pre-defined values stored in a database (not shown). These pre-defined values may correspond to expected reflected electromagnetic radiation values when one or more of: a printed region of a banknote is located in the measuring region 311; an unprinted region of a banknote (e.g. a window region) is located in the measuring region 311; no banknote is located in the measuring region 311.

As the banknote 312 continues its passage through the reflection detection apparatus 300, the processing means 306 receives a number of readings from the detector 304.

This apparatus 300 may be implemented in, for example, a banknote counting system. The processing means 306 may be operative to output a signal to a counting device only when the signal relating to the reflected electromagnetic radiation RL received at detector 304 changes from: that indicating that a printed region or window region is present in the measuring region 311; to a signal indicating that no banknote is present in the measuring region 211, or vice versa. However, no signal is output when the signal relating to the reflected electromagnetic radiation RL received at detector 304 changes from: that indicating that a printed region is present in the measuring region 311; to a signal indicating that a window region is present in the measuring region 311, or vice versa. That is, a count made by the counting device may be altered only when a trailing edge or a leading edge of a banknote 312 passes through the measuring region 311, but not when a leading edge or trailing edge of a window passes through the measuring region 311.

In optional arrangement, the shade 310 may comprise an injection moulded part (optionally a single injection moulded part) which, further optionally, comprises an absorbent black pigmented polymer such as, for example, polyethylene, nylon or polypropylene.

The emitter 302 may optionally comprise an LED and/or a laser of a number of different wavelengths. Optionally, the wavelength of the illuminating electromagnetic radiation IL may be in the IR region of the electromagnetic spectrum, e.g. about 890 nm.

The detector 304 may optionally comprise a photodiode configured to provide a broad spectrum detector (e.g. operative to detect reflected rays having wavelengths in the range of about 400 nm to about 1140 nm). In a particular optional arrangement, the detector may be operative to detect reflected rays having wavelengths in the range of about 880 nm to about 1140 nm.

FIG. 8 schematically illustrates a top view of an emitter-detector-item arrangement of the above-described reflective detection apparatus of FIG. 2 in an optional arrangement. Features similar to those illustrated in FIG. 7 are also illustrated in FIG. 8. In FIG. 8, the features common with those FIG. 7 are now designated with reference numerals of the type 4XX rather than 3XX. Thus, in FIG. 8, the reflective detection apparatus is denoted by reference number 400 (rather than 300), the emitter, by reference number 402 (rather than 402) and so on.

The arrangement illustrated in FIG. 8 is similar to that of FIG. 7 except for the replacement of a single emitter and detector with multiple emitters and detectors. Thus, in FIG. 8, first, second and third emitters 402a, 402b, 402c replace the single emitter 302 of the arrangement illustrated in FIG. 7, and first, second and third detectors 404a, 404b, 404c replace the single detector 304 of the arrangement illustrated in FIG. 7.

First emitter 402a is paired with first detector 404a, second emitter 402b is paired with second detector 404b, and third emitter 402c is paired with third detector 404c.

In view of the increase in the number of emitters and detectors compared with the arrangement illustrated in FIG. 7, consequent modifications are also required to the shade. Thus three emitter tubes 414a, 414a' and 414a" are provided in shade 410, along with three detector tubes 414b, 414W, 414b".

Illuminating electromagnetic radiation IL emitted by first emitter 402a will travel along first emitter tube 414a and be incident upon a portion of the banknote 412 in the measuring region 411. Reflected electromagnetic radiation RL reflected from the banknote 412 in the measuring region 411 will travel toward a mouth of first detector tube 414b and, upon entering the first detector tube 414b through the mouth thereof, will travel along first detector tube 414b to be received by first detector 404a.

Similarly, illuminating electromagnetic radiation IL emitted by second emitter 402b will travel along second emitter tube 414a' and be incident upon a portion of the banknote 412 in the measuring region 411. Reflected electromagnetic radiation RL reflected from the banknote 412 in the measuring region 411 will travel toward a mouth of second detector tube 414b' and, upon entering the second detector tube 414b' through the mouth thereof, will travel along second detector tube 414b' to be received by second detector 404b.

Further, the third emitter 402c is operative to emit light into third emitter tube 414a". Rays reflected from the portion of the banknote 412 in the measuring region 411 due to incidence of illuminating electromagnetic radiation IL from the third emitter tube 414a" will travel toward a mouth of third detector tube 414b" and, upon entering the third detector tube 414b" through the mouth thereof, will travel along third detector tube 414W' to be received by third detector 404c.

Thus, in the illustrated optional arrangement, the reflective detection apparatus 400 comprises a multiple angle point analysis apparatus.

As described above, the emitters are matched in their aperture paths with the detectors. Although in this instance there are three angles shown for both emitter and detector, more could be used in other optional arrangements if appropriate.

The emitters 402a, 402b, 402c are oriented so that illuminating electromagnetic radiation emitted therefrom is incident on the same part of the surface of the item being detected, i.e. the same point in the measuring region. It follows that the detectors 404a, 404b, 404c should be similarly oriented in order to receive electromagnetic radiation reflected from the same part of the surface.

The processor 406 may be operative to perform analysis of multiple output signals received from the detectors 404a, 404b, 404c.

In another optional arrangement, reflection measurement using multiple wavelengths could be applied to single or multiple angle measurements (i.e. the apparatus illustrated in FIG. 7 or 8 could be configured to make reflection measurements over a number of different wavelengths).

Possible configurations which could be based on the same geometry as the single wavelength measurement devices may comprise:

(a) Colour emitter to detector: a single coloured emitter replaces the emitter in the arrangement of FIG. 7. However, if more than one colour was to be employed at a particular angle, this may prove problematic. There may be two solutions, namely:

i. rotating the measurement around a circle: this maintains the angle and measures the same point of the note at the same time, but risks variation due to polarisation by reflection. The differences are not likely to be extreme and, if the same measurement orientation is used every time, the results will be consistent; and ii. delayed signals: measurement of points in a line could be measured in a cascading sequence by rows of parallel detection systems (point 1 is measured by station 1 at time 1, point 1 is measured by station 2 at time 2 whilst point 2 is being measured by station 1, etc.)

(b) A white light emitter source may be used in conjunction with one or more of:

i. a spectrometer in place of the photodiode detector;
   ii. the functional components of a spectrometer located in the aperture tube (i.e. diffraction grating and a CCD detector/CMOS); and
   iii. a digital camera.

Another optional arrangement of one or more embodiments of the present invention comprises a reflective detection apparatus operative to perform a full area scan. Such an arrangement is illustrated in FIG. 9. In this arrangement, there is provided a reflective detection apparatus 500 which comprises a strip electromagnetic radiation source 502 operative to emit illuminating electromagnetic radiation IL toward a banknote 506 located in the apparatus. The incident electromagnetic radiation IL may be reflected by the note as reflected electromagnetic radiation RL toward a line-scan camera 504.

In this arrangement, the mode of operation is the same as described in other arrangements above, except that the emitter/detector combination of the earlier described arrangement is replaced with strip electromagnetic radiation source 502 and line-scan camera 504. The banknote 506 may be moved relative to the strip electromagnetic radiation source 502 and line-scan camera 504 or vice versa. Such an arrangement may be used to obtain a full map of the surface reflectivity at a particular illumination angle by taking measurements of the value of the reflected electromagnetic radiation RL using line-scan camera 504.

This map may optionally be monochrome or coloured (i.e. reflected electromagnetic radiation RL is collected by way of a colour camera or via a diffraction grating coupled to a 2D CMOS array). Further, the map may be built up from a series of measurements obtained by illuminating the banknote over a series of angles (e.g. similar to the arrangement illustrated in FIG. 8, but with the strip electromagnetic radiation sources and line-scan cameras effectively extending into/out of the plane of the paper).

In an optional arrangement, IR light just outside the visible spectrum may be used. In a further optional arrangement, one way of potentially reducing noise would be to employ a filter to filter out white light.

In all of the above-described arrangements, a banknote may be moved relative to the reflective detection apparatus (i.e. moved along a transport path through the apparatus). However, in other optional arrangements, the banknote may be held static and the apparatus moved relative to the banknote.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods and apparatus is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as, Liberate, OCAP, MHP, Flash, HTML and associated languages, JavaScript, PHP, C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A detection apparatus for detecting presence or otherwise of an item comprising at least two regions having different optical characteristics, said apparatus comprising:
   an emitter operative to illuminate a measuring region of said apparatus with electromagnetic radiation; and
   a detector located and operative to receive electromagnetic radiation reflected from said measuring region of said apparatus and operative to output a signal corresponding to a measured characteristic of said electromagnetic radiation reflected from said measuring region,
   wherein said apparatus is operative to compare said measured characteristic with a set of pre-defined characteristics and determine whether said measured characteristic is consistent with at least one of said pre-defined characteristics,
   wherein the pre-defined characteristics comprise one or more of a first range of values corresponding to expected detector output signal values if an opaque or semi-opaque region of the item is located in the measuring region; a second range of values corresponding to expected detector output signal values if a transparent or semi-transparent region of the item is located in the measuring region; and a third range of values corresponding to expected detector output signal values if no item is present in the measuring region, and
   wherein the apparatus is operative to output a signal indicative of presence or otherwise of one of said at least two regions of said item in said measuring region.

2. The apparatus according to claim 1, wherein said output signal corresponding to a measured characteristic is proportional to an intensity of reflected electromagnetic radiation received.

3. The apparatus according to claim 1, wherein said detector is operative to communicate said output signal corresponding to a measured characteristic to a processor which is operative to compare a value of said output signal with said set of pre-defined characteristics, which comprise a set of pre-defined values indicative of presence or otherwise of any one of said at least two regions of said item in said measuring region, and said processor operative to output said signal indicative of presence or otherwise of one of said at least two regions of said item in said measuring region dependent upon said comparison.

4. The apparatus according to claim 1, wherein said pre-defined characteristics comprise a first range of values corresponding to expected detector output signal values if an opaque or semi-opaque region of said item is located in said measuring region; a second range of values corresponding to expected detector output signal values if a transparent or semi-transparent region of said item is located in said measuring region; and a third range of values corresponding to expected detector output signal values if no item is present in said measuring region.

5. The apparatus according to claim 4, wherein said item comprises a banknote.

6. The apparatus according to claim 5, wherein said opaque or semi-opaque region comprises a printed region of said banknote.

7. The apparatus according to claim 5, wherein said transparent or semi-transparent region of said item comprises an unprinted or window region of said banknote.

8. The apparatus according to claim 1, wherein said detector has associated therewith a shade, said shade including at least one aperture, wherein said aperture is located with respect to the detector to permit electromagnetic radiation reflected from said measuring region of said apparatus to be received by the detector.

9. The apparatus according to claim 8, wherein said aperture comprises a tubular region in said shade.

10. The apparatus according to claim 9, wherein said detector is located within said tubular region.

11. The apparatus according to claim 1, wherein said emitter has associated therewith a shade, said shade including an aperture, wherein said aperture is located with respect to the emitter to permit electromagnetic radiation emitted from the emitter to be directed toward the measuring region of said apparatus.

12. The apparatus according to claim 11, wherein said aperture comprises a tubular region in said shade.

13. The apparatus according to claim 12, wherein said emitter is located within said tubular region.

14. The apparatus according to claim 1, further comprising a shade, wherein said shade comprises a plurality of emitter apertures and a plurality of detector apertures, wherein each of said plurality of emitter apertures has associated therewith an emitter and each of said plurality of detector apertures has associated therewith a detector.

15. The apparatus according to claim 1, wherein said emitter is operative to emit coherent electromagnetic radiation.

16. The apparatus according to claim 1, wherein said emitter comprises at least one LED.

17. The apparatus according to claim 16, wherein said at least one LED is operative to emit light in the infra-red range of the electromagnetic spectrum.

18. The apparatus according to claim 1, wherein said emitter comprises a white light emitter source.

19. The apparatus according to claim 1, wherein said emitter comprises at least one strip electromagnetic radiation source.

20. The apparatus according to claim 1, wherein said detector comprises at least one photodiode.

21. The apparatus according to claim 20, wherein said at least one photodiode is operative to detect light in the infra-red range of the electromagnetic spectrum.

22. The apparatus according to claim 1, wherein said detector comprises at least one line-scan camera.

23. The apparatus according to claim 1, wherein said detector comprises at least one spectrometer and a CCD or CMOS image sensor.

24. The apparatus according to claim 1, wherein
   said emitter comprises at least one of:
      a plurality of LEDs;
      a plurality of white light emitter sources; and
      a plurality of strip electromagnetic radiation sources; and
   said detector comprises at least one of:

a plurality of photodiodes;
a plurality of line-scan cameras; and
a plurality of spectrometers and CCD or CMOS image sensors;
wherein each one of said plurality of LEDs is paired with a corresponding one of said plurality of photodiodes and/or plurality of line-scan cameras and/or plurality of spectrometers and CCD or CMOS image sensors, further wherein each one of said plurality of white light emitter sources is paired with a corresponding one of said plurality of photodiodes and/or plurality of line-scan cameras and/or plurality of spectrometers and CCD or CMOS image sensors, and yet further wherein each one of said plurality of strip electromagnetic radiation sources is paired with a corresponding one of said plurality of photodiodes and/or plurality of line-scan cameras and/or plurality of spectrometers and CCD or CMOS image sensors.

25. The apparatus according to claim 24, wherein said at least one of said plurality of LEDs is operative to emit light in the infra-red range of the electromagnetic spectrum.

26. The apparatus according to claim 24, wherein said at least one of said plurality of photodiodes is operative to detect light in the infra-red range of the electromagnetic spectrum.

27. The apparatus according to claim 1, wherein said apparatus includes a transport path, of which a part comprises said measuring region, and along which said item transport path said item is conveyable.

28. A banknote counting apparatus comprising the detection apparatus according to claim 1, said banknote counting apparatus further comprising a note counting device operative to maintain a count of banknotes conveyed through said apparatus, and further operative to receive said signal indicative of presence or otherwise of one of said at least two regions of said item in said measuring region, wherein when said signal changes from a level indicative of presence of one of said at least two regions of said item in said measuring region to a level indicative of absence of an item in said measuring region, or vice versa, said note counting device is operative to alter said count.

29. The apparatus according to claim 28, wherein, upon a signal change, said note counting device is operative to alter said note count by incrementing said count.

30. A method of detecting presence or otherwise of an item comprising at least two regions having different optical characteristics, said method comprising:
    illuminating a measuring region of said item with electromagnetic radiation;
    receiving electromagnetic radiation reflected from said measuring region and outputting a signal corresponding to a measured characteristic of said electromagnetic radiation reflected from said measuring region;
    comparing said measured characteristic with a set of pre-defined characteristics,
    wherein the pre-defined characteristics comprise one or more of a first range of values corresponding to expected detector output signal values if an opaque or semi-opaque region of the item is located in the measuring region; a second range of values corresponding to expected detector output signal values if a transparent or semi-transparent region of the item is located in the measuring region; and a third range of values corresponding to expected detector output signal values if no item is present in the measuring region, and
    wherein if said measured characteristic is consistent at least one of said pre-defined characteristics, an output signal indicative of presence or otherwise of one of said at least two regions of said item in said measuring region is outputted.

31. The method according to claim 30, wherein said output signal corresponding to a measured characteristic is proportional to an intensity of reflected electromagnetic radiation received.

32. The method according to claim 30, further comprising
    communicating said output signal corresponding to a measured characteristic to a processor which is operative to compare a value of said output signal with said set of pre-defined characteristics, which comprise a set of pre-defined values indicative of presence or otherwise of any one of said at least two regions of said item in said measuring region, and
    outputting, from said processor said signal indicative of presence or otherwise of one of said at least two regions of said item in said measuring region based on said comparison.

33. The method according to claim 30, wherein said pre-defined characteristics comprise:
    a first range of values corresponding to expected detector output signal values if an opaque or semi-opaque region of said item is located in said measuring region;
    a second range of values corresponding to expected detector output signal values if a transparent or semi-transparent region of said item is located in said measuring region; and
    a third range of values corresponding to expected detector output signal values if no item is present in said measuring region.

34. The method according to claim 33, wherein said item comprises a banknote.

35. The method according to claim 34, wherein said opaque or semi-opaque region comprises a printed region of said banknote.

36. The method according to claim 34, wherein said transparent or semi-transparent region of said item comprises an unprinted or window region of said banknote.

37. The method according to claim 30, wherein said electromagnetic radiation comprises coherent electromagnetic radiation.

38. The method according to claim 30, wherein said electromagnetic radiation comprises light in the infra-red range of the electromagnetic spectrum.

39. The method according to claim 30, wherein said electromagnetic radiation further comprises white light.

40. The method according to claim 30, further comprising conveying said item via a transport path through said detection apparatus, of which a part of said transport path comprises said measuring region.

41. The method according to claim 30, comprising:
    providing a banknote counting apparatus comprising a note counting device for maintaining a count of banknotes conveyed through said apparatus, receiving in said banknote counting apparatus, said signal indicative of presence or otherwise of one of said at least two regions of said item in said measuring region; and
    altering said count of banknotes when said signal changes from a level indicative of presence of one of said at least two portions of said item in said measuring region to a level indicative of absence of an item in said measuring region, or vice versa.

42. The method according to claim 41, wherein said altering step comprises altering said note count by incrementing said count.

43. The apparatus according to claim 28, wherein said banknote comprises at least one opaque or semi-opaque region and at least one transparent or semi-transparent region.

\* \* \* \* \*